(12) United States Patent
Huang

(10) Patent No.: US 8,499,493 B2
(45) Date of Patent: Aug. 6, 2013

(54) SPROUT CULTIVATION DEVICE

(75) Inventor: Chin-Ming Huang, Taipei (TW)

(73) Assignee: Yan-Hua Biotech Co., Ltd., Taipei (TW)

( * ) Notice: Subject to any disclaimer, the term of this patent is extended or adjusted under 35 U.S.C. 154(b) by 114 days.

(21) Appl. No.: 13/093,014

(22) Filed: Apr. 25, 2011

(65) Prior Publication Data

US 2012/0266535 A1    Oct. 25, 2012

(51) Int. Cl.
*A01G 31/00*    (2006.01)

(52) U.S. Cl.
USPC ............................................................ 47/61

(58) Field of Classification Search
USPC .................... 47/59 R, 60, 61, 66.1
See application file for complete search history.

(56) References Cited

U.S. PATENT DOCUMENTS

| | | | | |
|---|---|---|---|---|
| 1,396,235 A | * | 11/1921 | Renstrom | 47/16 |
| 2,889,049 A | * | 6/1959 | Hauser | 210/476 |
| 3,380,190 A | * | 4/1968 | Granger | 47/58.1 R |
| 3,768,201 A | * | 10/1973 | Yoo | 47/16 |
| 4,000,719 A | * | 1/1977 | Richards | 119/51.13 |
| 4,180,941 A | * | 1/1980 | Korematsu | 47/14 |
| 4,439,949 A | * | 4/1984 | Ocko | 47/61 |
| 4,471,572 A | * | 9/1984 | Young | 47/61 |
| 4,485,765 A | * | 12/1984 | Schwartz et al. | 119/51.13 |
| 4,617,874 A | * | 10/1986 | Zammarano | 119/51.12 |
| 4,787,172 A | * | 11/1988 | Lee | 47/16 |
| 5,241,781 A | * | 9/1993 | Malczyk | 47/17 |
| 5,782,035 A | * | 7/1998 | Locke et al. | 47/79 |
| 2005/0274073 A1 | * | 12/2005 | Brooke et al. | 47/59 R |
| 2006/0112620 A1 | * | 6/2006 | Rapp | 47/29.6 |
| 2006/0168882 A1 | * | 8/2006 | Hashimoto et al. | 47/64 |

* cited by examiner

*Primary Examiner* — Rob Swiatek
*Assistant Examiner* — Ebony Evans
(74) *Attorney, Agent, or Firm* — Alan Kamrath; Kamrath IP Lawfirm, P.A.

(57) ABSTRACT

A sprout cultivation device has a carrying body, a controlling device, at least one container, a tube and a sprinkling device. The carrying body controls the amount of water by a water controller and changes the pumping time by a timer. Moreover, an actuating switch is mounted to the carrying body to start a motor to pump the fluid to a cultivation space via the tube. Because seeds of sprouts are embedded in a tray of the container and the fluid is regularly injected into the container via the tube by the motor, the sprout cultivation device is operated automatically without manpower and accelerates the mature time of the sprouts to increase harvest. Moreover, the carrying body interiorly defines a reservoir space for accommodating the fluid to significantly diminish the carrying body's size.

12 Claims, 11 Drawing Sheets

SPROUT CULTIVATION DEVICE

BACKGROUND OF THE INVENTION

1. Field of the Invention

The present invention relates to a sprout cultivation device and, more particularly, to a sprout cultivation device that has an automatic sprinkling to cultivate sprout seeds.

2. Description of Related Art

Because people are paying more attention to health, they are particularly fastidious about personal diet, living, and exercise in all aspects. For the diet aspect, many people in this modern society select a healthy diet and take organic fruit and vegetables on tables in priority. Because sprouts are popularly marketed and have plenty of nutrition, people use sprouts as one major material in breakfast, juice or vegetarian meals. Therefore, cultivating sprouts in organic measures has economic benefits and even can be developed or popularized in a household.

A conventional cultivating method for sprouts is to spread vegetable seeds on a culture dish placed in a culturing room to cultivate seeds with a definite water quantity and moisture. When sprouts in the cultivation room are ready for harvest, cultivators have to take the sprouts one tray by one tray. This conventional cultivation method needs a very large space and needs to sprinkle the sprouts during growth, so that the cultivators suffer high cost in manpower, farming tools, and factory area for lead time, and such cost is not able to be reduced. For an amateur, the cultivation place is a major problem difficult to be overcome.

SUMMARY OF THE INVENTION

One main objective of the present invention is to provide a sprout cultivation device, which is suitable for professional cultivators and is even more suitable for amateurs having a limited space.

Another main objective of the present invention is to provide a sprout cultivation device, which needs no cultivation tray and is able to cultivate large amounts of sprouts to reduce cost.

Still another main objective of the present invention is to provide a sprout cultivation device, which has a simple structure and provides an easy cultivation operation to regularly water the seeds, to shorten the cultivation period and to increase the harvest of sprouts.

To achieve the foregoing objectives, the sprout cultivation device comprises:

a carrying body having a reservoir space for accommodating fluid and having an inlet and an outlet communicating to the reservoir space;

a controlling device mounted on the carrying body and electrically connected to a motor attached to the carrying body;

at least one container each defining a cultivation space and multiple supporting pedestals extending inward from an inner sidewall to support a tray;

at least one tube connecting the carrying body and located inside the cultivation space to transport the fluid to the cultivation space; and a sprinkling device connected to the tube for watering.

Further benefits and advantages of the present invention will become apparent after a careful reading of the detailed description with appropriate reference to the accompanying drawings.

DETAILED DESCRIPTION OF THE PREFERRED EMBODIMENTS

A sprout cultivation device in accordance with the present invention substantially comprises a carrying body, a controlling device, at least one container, a tube and a sprinkling device. The carrying body controls the amount of water by a water controller and changes the pumping time by a timer. Moreover, an actuating switch is mounted on the carrying body to start a motor to pump fluid to a cultivation space via the tube. Because seeds of sprouts are embedded in a tray of the container and the fluid is continuously injected into the container via the tube by the motor, the sprout cultivation device is operated automatically without manpower and accelerates the mature time of the sprouts to increase harvest. Moreover, the carrying body interiorly defines a reservoir space for accommodating fluids to significantly diminish the carrying body's size.

Figure 1:
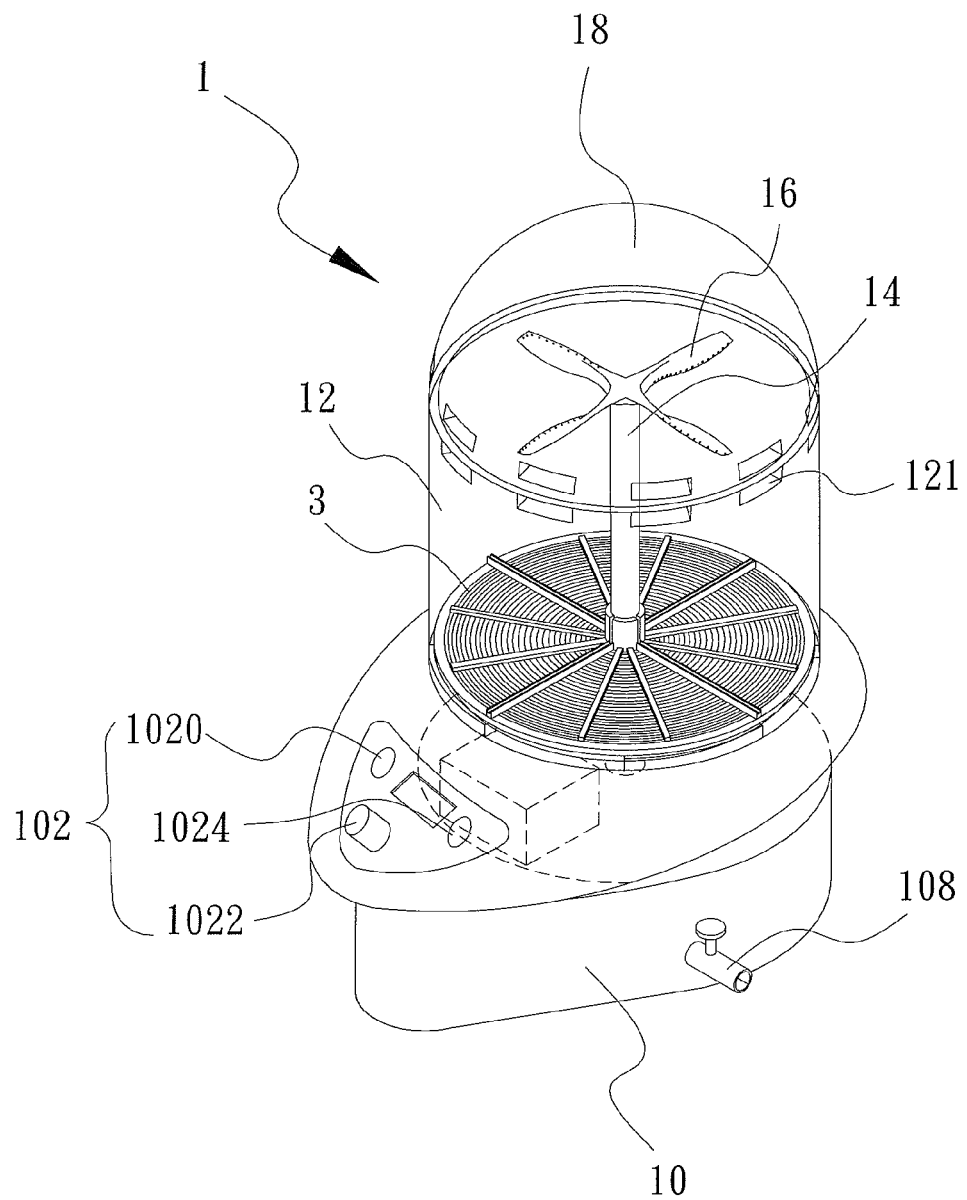
FIG. 1 is a perspective view of one embodiment of a sprout cultivation device in accordance with the present invention.
Figure 2:
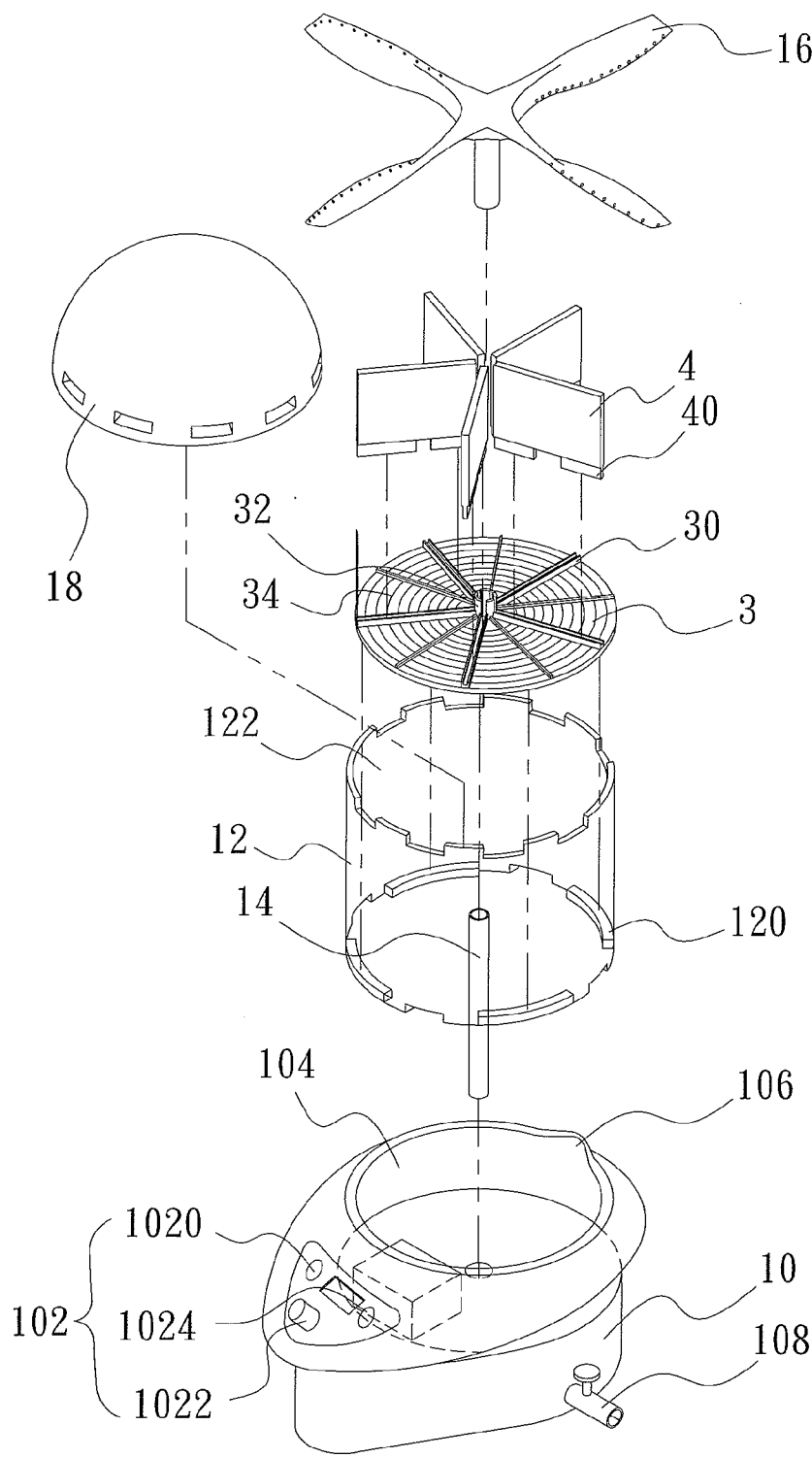
FIG. 2 is an exploded perspective view of the sprout cultivation device of FIG. 1.
Figure 3:
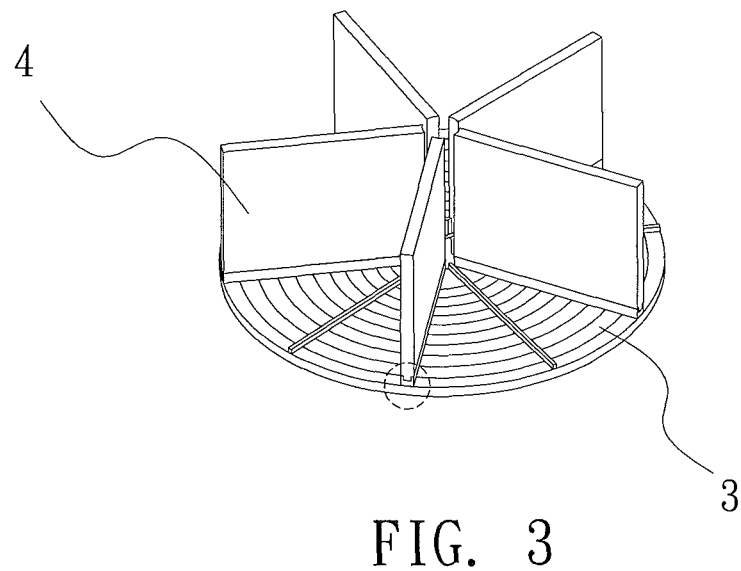
FIG. 3 is a perspective view of a tray with a divider of the sprout cultivation device.
Figure 3A:
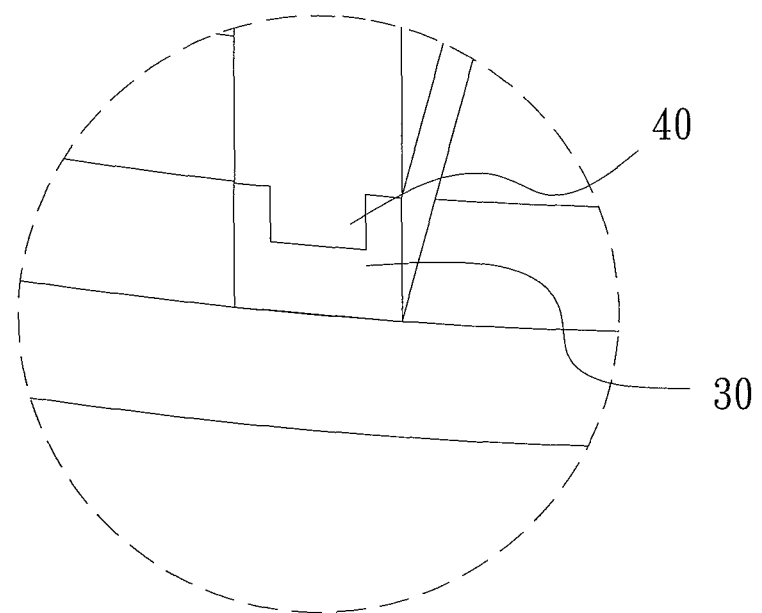
FIG. 3A is an enlarged perspective view of a joint of the tray and the divider of the sprout cultivation device.
Figure 4:
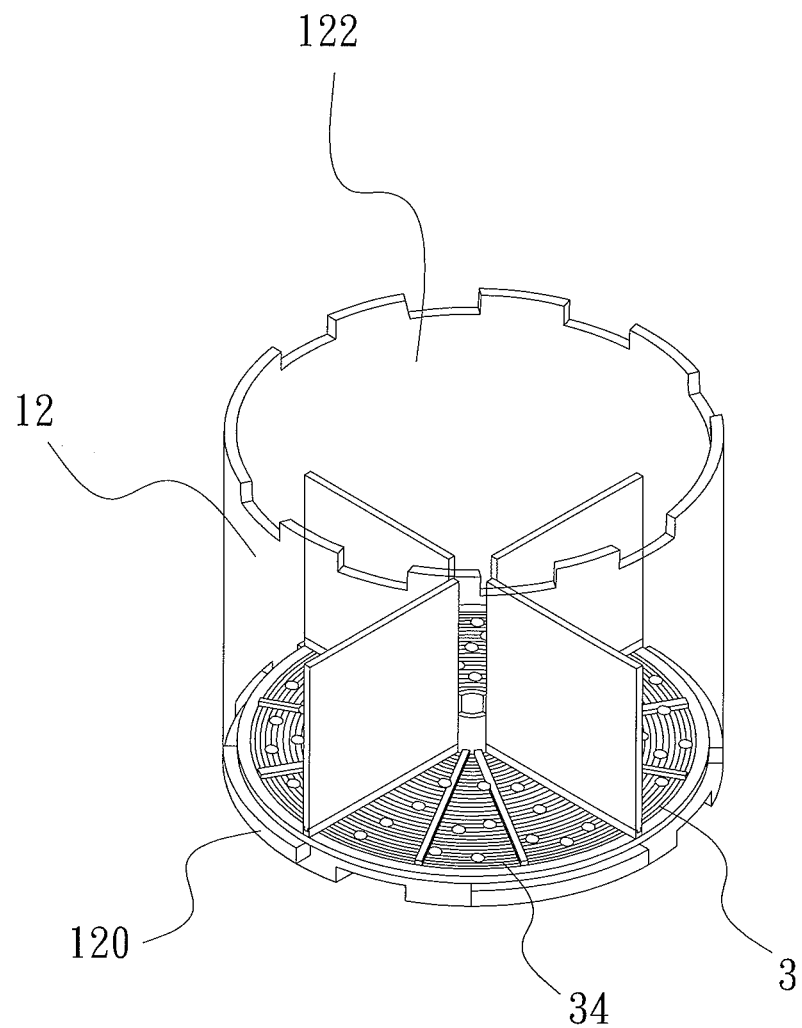
FIG. 4 is a perspective view of the combination of the tray and the divider with a container of the sprout cultivation device.
Figure 5:
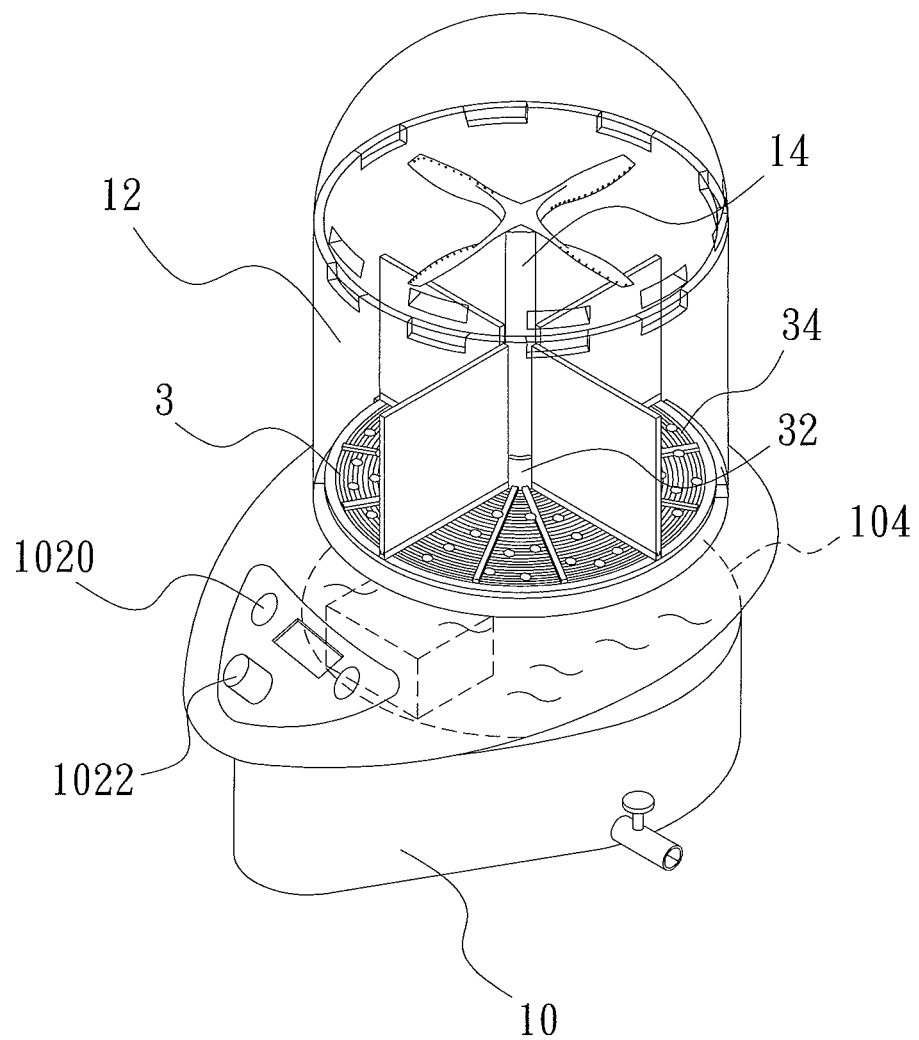
FIG. 5 is a perspective view of the combination of the tray and the divider with the container mounting on a carrying body filled with fluid.
Figure 6:
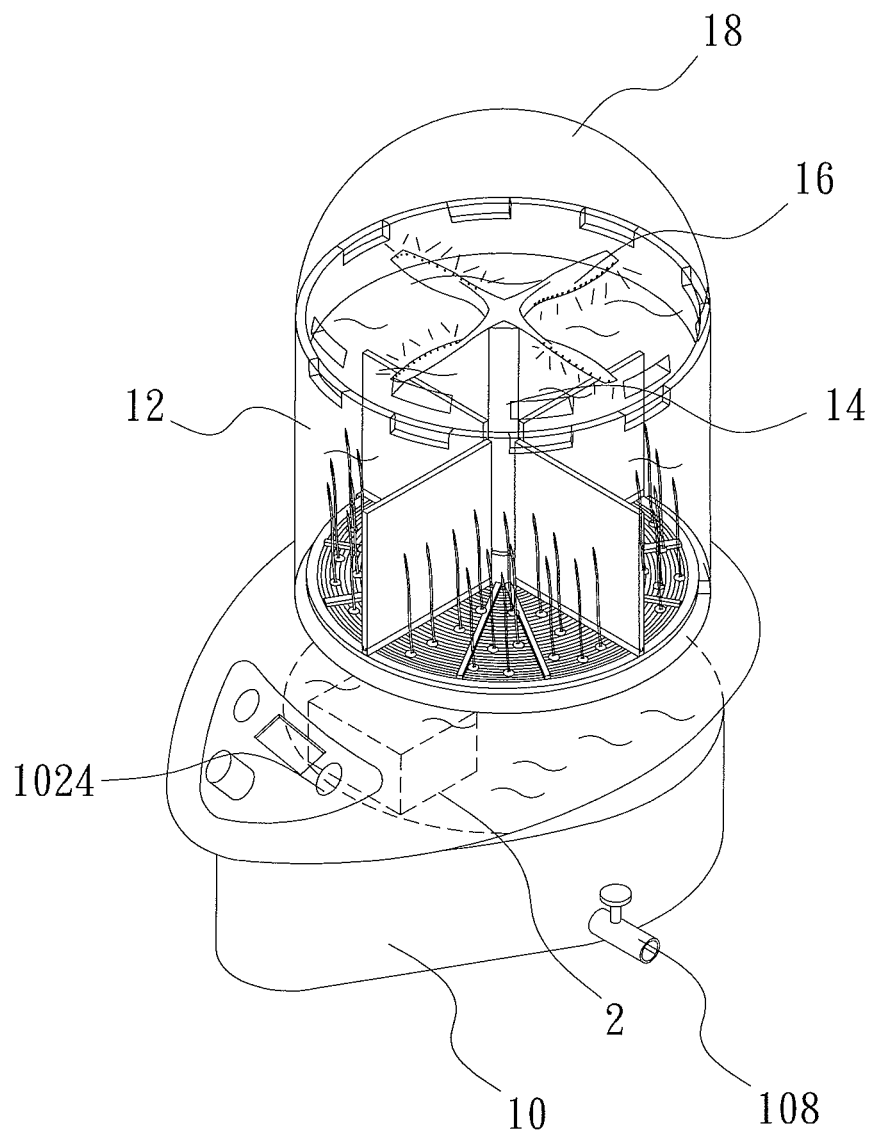
FIG. 6 is an operational perspective view of the sprout cultivation device.

As shown in FIGS. 1 and 2, one preferred embodiment of a sprout cultivation device 1 in accordance with the present invention comprises a carrying body 10 with a controlling device 102, at least one container 12, a tube 14, and a sprinkling device 16. The carrying body 10 interiorly defines a reservoir space 104 for accommodating fluids and has an inlet 106 and an outlet 108 communicating to the reservoir space 104 to significantly diminish the carrying body's size. Moreover, the controlling device 102 has a timer 1020, a water controller 1022, and an actuating switch 1024 to start a motor 2 (shown in FIG. 6) to perform the function of automatic watering.

A tray 3 with embedded seeds is placed into one container 12 and fixed by multiple supporting pedestals 120 inside the container 12. Then, the container 12 is mounted on the carrying body 10. Because the tube 14 is connected to the carrying body 10 and accommodated inside the cultivation space 122, the tube 14 guides the fluid into the cultivation space 122 to water the seeds by the sprinkling device 16 of the tube 14.

Moreover, the tray 3 has multiple positioning tracks 30 radially arranged thereon to engage multiple tongues 40 of a divider 4 correspondingly. An intersecting center of the multiple positioning tracks 30 has a sleeving portion 32. Multiple ribs 34 are concentrically arranged between two adjacent positioning tracks 30. Lastly, the container 12 has a cover 18 mounted on its top to cover the container 12.

Operation of the sprout cultivation device of this invention is illustrated according to FIGS. 3 to 6. To cultivate different types of sprouts on the tray 3, the divider 4 is attached to the tray 3 by inserting the multiple tongues 40 into the positioning tracks 30 so that the tray 3 is divided into multiple sections (taking four sections as example, but not limited thereto) for cultivating different sprouts (Without the divider 4, it is selective to cultivate only one type of sprout).

After dividing the tray 3, the tray 3 is accommodated in the container 12 and is supported and located by the multiple supporting pedestals 120 so that the cultivating space 122 defined by the container 12 and the tray 3 is used for growth of sprouts. Then, the container 12 is mounted to or multiple containers 12 are selectively stacked on the carrying body 10. Because the tube 14 attached to the carrying body 10 for watering penetrates the sleeving portion 32 of the tray 3, the tray 3 is fixed by the tube 14. Moreover, the multiple ribs 34 extended between the two adjacent positioning tracks 30 have grooves to improve the fluid drain downward to avoid water accumulation which easily causes rotten seeds or unhealthy growth.

After completing the combination of above elements, the controlling device 102 on the carrying body 10 is ready to control the operation of the sprout cultivation device. Because the controlling device 102 mainly combines the timer 1020, the water controller 1022, and the actuating switch 1024 for starting the motor 2, the fluid has to be pumped into the reservoir space 104 via the inlet 106. Then, the timer 1020 and the water controller 1022 are set to adjust the sprinkling conditions before actuating the motor 2. After completing the forgoing setting preparation, the actuating switch 1024 is pressed to make the motor 2 to pump the fluid via the tube 14 upward. Because a distal end of the tube 14 has the sprinkling device 16 (optionally designed in cross shape to be T shape or other shapes to evenly spread the fluid within the container 12), the cover 18 is mounted on the top of the container 12. When renewing the fluid, the used fluid is drained out from the reservoir space 104 via the outlet 108 to make the reservoir space 104 have no fluid.

Figure 7:
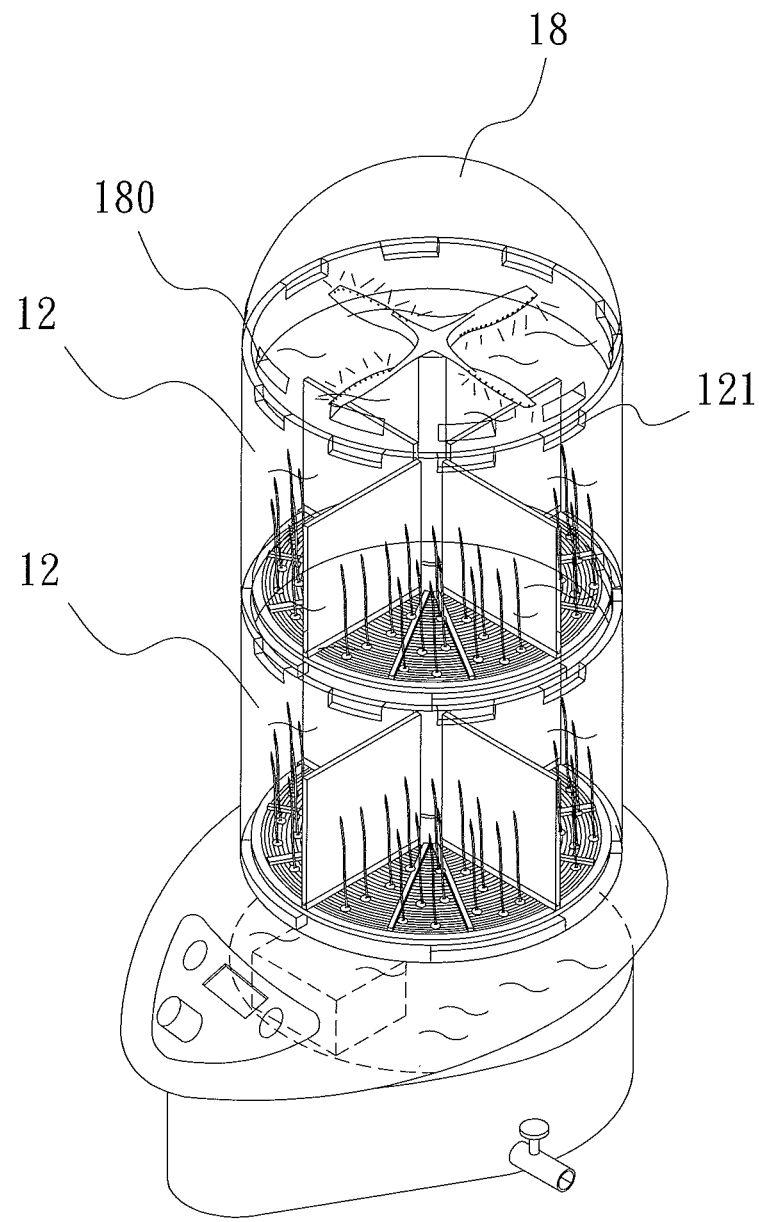
FIG. 7 is a perspective view of another embodiment of the sprout cultivation device in accordance with the present invention.

As shown in FIG. 7, another embodiment of the sprout cultivation device in accordance with the present invention, multiple units of the aforementioned containers 12 are stacked upward to increase the amount of cultivated sprouts. Moreover, the cover 18 has multiple ventilation holes 180, and the container 12 has multiple ventilation holes 121 to allow air exchange. When the multiple containers 12 are stacked together, the ventilation holes 180, 121 avoid air insufficiency in the interior and allow the air to freely flow to help the growth of sprouts.

Figure 8:
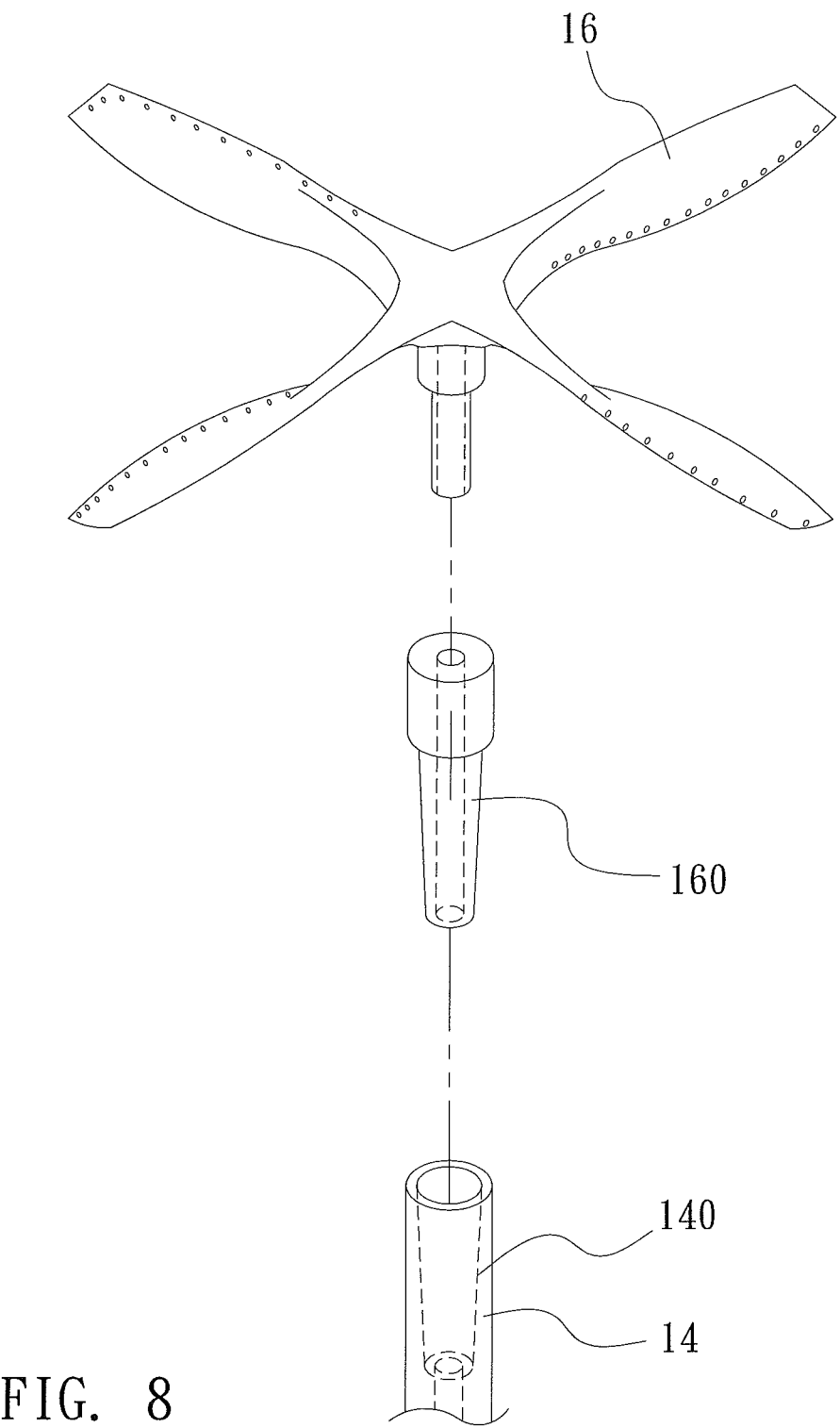
FIG. 8 is an exploded perspective view of a sprinkling device of the sprout cultivation device.

As shown in FIG. 8, which is a structure illustration regarding to sprinkling of the sprout cultivation device, the sprinkling device 16 has a tapered jacket 160 engaged in a recess 140 defined inside the tube 14. By combining the jacket 160 and the recess 140, the sprinkling device 16 is more stable when rotating and is not easy to disengage.

Figure 9:
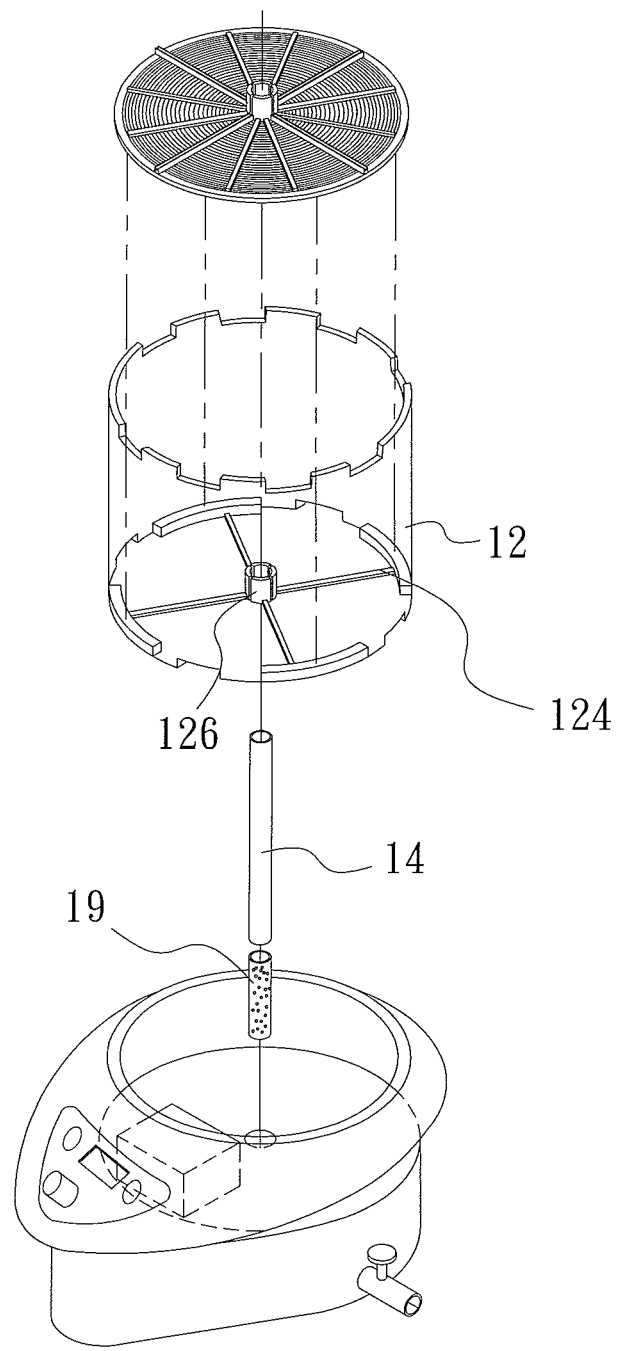
FIG. 9 is an exploded perspective view of one derivative embodiment of the container in the sprout cultivation device.

As shown in FIG. 9, which is a structure illustration of another embodiment of the container, the container 12 further has multiple propping bars 124 extending radially from an inner sidewall of the container 12 to connect to a connecting portion 126, which allows the tube 14 to penetrate and fix therethrough. Such structure strengthens the container 12 and supports the tray 3 loaded with sprouts fully. Moreover, the tube 14 near the carrying body 10 further has a filter 19 (filled with an ionized mineral or a device enables the function to sterilize and purify water) to purify the cycled water and provide clean water thereby.

By having the foregoing structure, the sprout cultivation device 1 is operated automatically, needs no manpower and accelerates the mature time of the sprouts to increase harvest.

Figure 10:
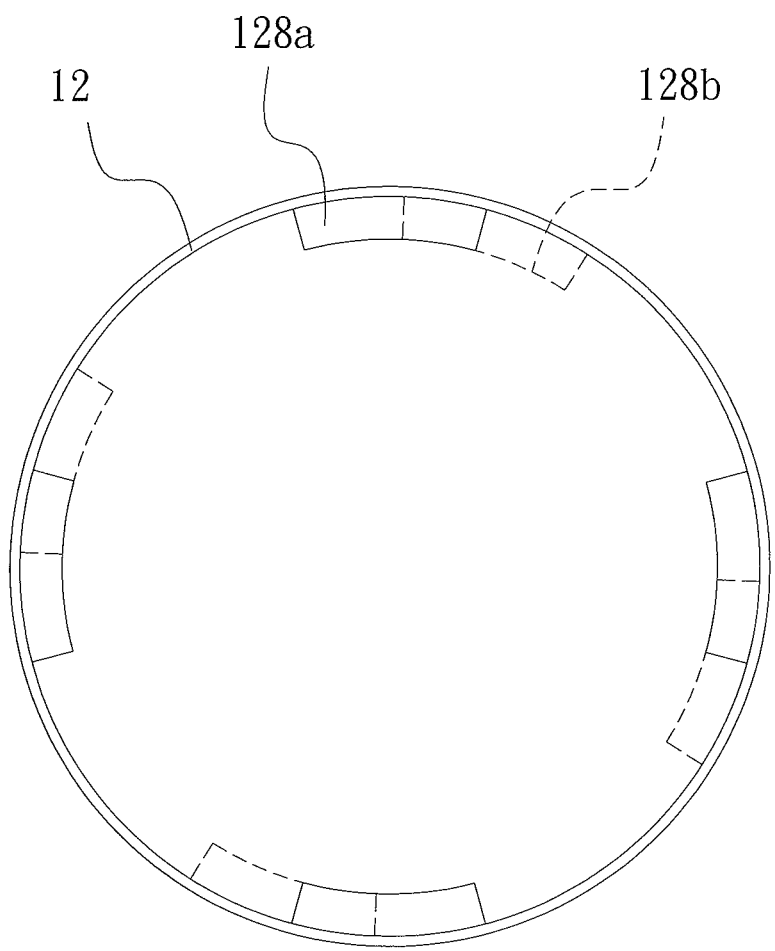
FIG. 10 is a cross-sectional view showing a combination of two adjacent containers.

As shown in FIG. 10, which is a plan view of combination of multiple containers, two adjacent containers 12 each have multiple positioning blocks 128a, 128b at two side edges (the solid line shows the positioning blocks 128a of a first container 12; and the dotted line shows the positioning blocks 128b of a second container 12). By engaging the positioning blocks 128a of the first container 12 and the positioning blocks 128b of the second container 12, the multiple containers 12 are stably stacked in numbers to avoid falling caused by an unstable center of gravity.

Figure 11:
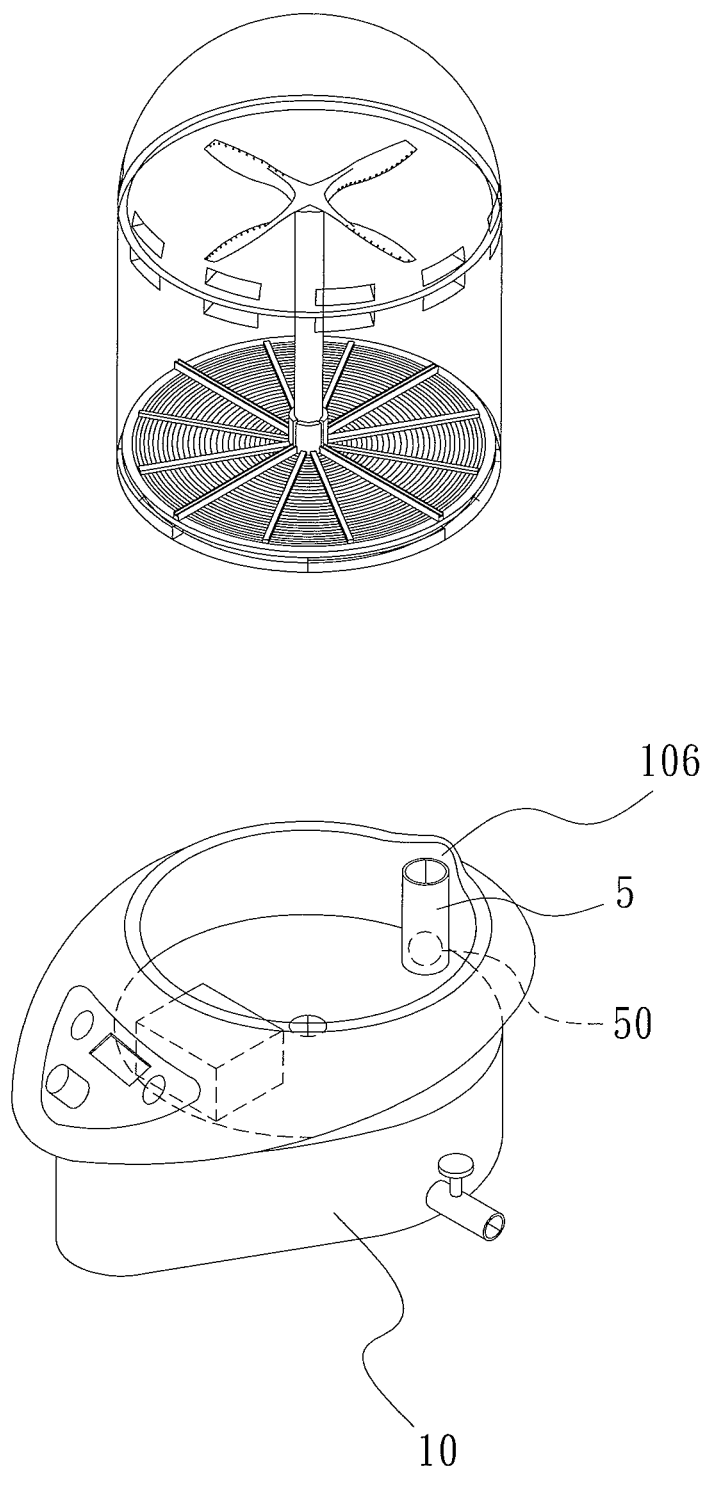
FIG. 11 is a perspective of the sprout cultivation device loaded with a dosage device.

As shown FIG. 11, which is an illustrative drawing of the sprout cultivation device combined with a dosage device, the carrying body 10 has a meter 5 with a bouyage 50 mounted on the inlet 106 to read the amount of the fluid inside the carrying body 10 for adjustment.

Although this invention has been described in its preferred forms with a certain degree of particularity, it is understood that the present invention of the preferred forms has been made only by way of example and that numerous changes in the details of construction and the combination and arrangement of parts any be resorted to without departing from the spirit and scope of the invention.

What is claimed is:

1. A sprout cultivation device comprising:
   a carrying body having a reservoir space for accommodating fluid and an inlet and an outlet communicating to the reservoir space;
   a controlling device mounted on the carrying body and electrically connected to a motor attached to the carrying body;
   at least one container each defining a cultivation space and multiple supporting pedestals extending inward from an inner sidewall to support a tray, wherein the tray has multiple positioning tracks to engage a divider by insertion, wherein the divider has at least one tongue to engage the multiple positioning tracks;
   at least one tube connected to the carrying body and located inside the cultivation space to guide the fluid to the cultivation space; and
   a sprinkling device connected to the tube for watering.

2. The sprout cultivation device as claimed in claim 1, wherein the controlling device has a timer, a water controller and an actuating switch to start the motor.

3. The sprout cultivation device as claimed in claim 1, wherein each of the at least one container further has multiple propping bars extending from the inner sidewall of the container to connect to a connecting portion which is penetrated by the tube.

4. The sprout cultivation device as claimed in claim 1, wherein the tray has multiple ribs arranged between adjacent two of the multiple positioning tracks.

5. The sprout cultivation device as claimed in claim 4, wherein the multiple positioning tracks intersect at a sleeving portion.

6. The sprout cultivation device as claimed in claim 1, further comprising a cover capped on a topmost one of the at least one container.

7. The sprout cultivation device as claimed in claim 6, wherein the cover has multiple ventilation holes for air exchange.

8. The sprout cultivation device as claimed in claim 1, wherein the at least one container each or selectively has multiple ventilation holes for air exchange.

9. The sprout cultivation device as claimed in claim 1, wherein the sprinkling device further has a jacket connected to the tube.

10. The sprout cultivation device as claimed in claim 9, wherein the tube has a recess to receive the jacket of the sprinkling device.

11. The sprout cultivation device as claimed in claim 1, wherein the tube has a filter near the carrying body for filtering fluid.

12. The sprout cultivation device as claimed in claim 1, wherein the carrying body has a meter with a bouyage attached at the inlet.

* * * * *